United States Patent [19]

Iwata et al.

[11] 4,083,058
[45] Apr. 4, 1978

[54] FLASH AND CAMERA APPARATUS HAVING A PLURALITY OF FLASH AND DAYLIGHT OPERATION MODES

[75] Inventors: Hiroshi Iwata, Osaka; Yu Tsuzuki, Hirakata, both of Japan

[73] Assignee: West Electric Company, Ltd., Osaka, Japan

[21] Appl. No.: 675,756

[22] Filed: Apr. 12, 1976

[30] Foreign Application Priority Data

Apr. 17, 1975  Japan .................................. 50-47129

[51] Int. Cl.² ............................................. G03B 15/05
[52] U.S. Cl. ................................. 354/128; 354/145; 354/149
[58] Field of Search ............... 354/126, 127, 128, 145, 354/149, 53, 289, 270

[56] References Cited

U.S. PATENT DOCUMENTS

| | | | |
|---|---|---|---|
| 2,998,548 | 8/1961 | Girard | 354/128 |
| 3,259,043 | 7/1966 | Pagel | 354/128 |
| 3,374,718 | 3/1968 | Hochreiter | 354/53 |
| 3,393,620 | 7/1968 | Reiche et al. | 354/128 |
| 3,424,071 | 1/1969 | Schwahn | 354/128 |
| 3,526,179 | 9/1970 | Ogiso | 354/128 |
| 3,906,526 | 9/1975 | Toyoshimi et al. | 354/289 |
| 3,916,424 | 10/1975 | Prochnow | 354/149 |
| 3,921,185 | 11/1975 | Yazaki | 354/270 |

FOREIGN PATENT DOCUMENTS

2,403,279  7/1975  Germany ............................ 354/149

Primary Examiner—L. T. Hix
Assistant Examiner—Alan Mathews
Attorney, Agent, or Firm—Stevens, Davis, Miller & Mosher

[57] ABSTRACT

Flash and camera apparatus integrally incorporating an electronic flashing device for firing a flash discharge tube and a photographic camera device with a fixed focus lens system. The apparatus includes an aperture change-over mechanism for changing the aperture to an appropriate value depending on the paticular mode of photography selected. The selectable modes include both far and near modes for objects which are within allowable range of the camera to achieve proper flash mode photography and also daylight mode photography. An indication element for indicating the existence of a condition under which the electronic flash device is able to fire in the flash mode and which indicates whether the distance to the object is far or near is also provided. Further provided is a switch mechanism for simultaneously performing the functions of operating the aperture changeover mechanism, operating the indication element and supplying power to the electronic flash device. In this manner, daylight and flash mode photography are simplified, the allowable distance to the object for proper photography can be increased, and the distance from the object, i.e. far or near, is indicated for identification.

5 Claims, 7 Drawing Figures

FLASH AND CAMERA APPARATUS HAVING A PLURALITY OF FLASH AND DAYLIGHT OPERATION MODES

The present invention relates to a flash and camera apparatus integrally incorporating a photographic camera device with a fixed focus lens system and an electronic flash device. More particularly, it relates to flash and camera apparatus in which the aperture value of an iris diaphragm is changed depending on the distance from the object to the camera during flash mode photography. The distance from the object as well as the firing condition of the electronic flash device are shown by a simple indicator.

A flash and camera apparatus has been put into practice in which a photographic camera with a fixed focus lens system having no complex flashmatic mechanism and an electronic flash device are integrally incorporated. In flash mode photography, a larger aperture of an iris diaphragm is set compared to that used with daylight mode photography by the simple operation of changing the aperture in linked relation with a power switch for the electronic flashing device.

In the prior art apparatus, however, the aperture value set in flash mode photography is limited to a single value and hence there is, more or less, the problem of improper exposure considering the fact that in normal flash mode photography the aperture value or $f$-value is calculated from the amount of light available from the electronic flashing device (usually referred to as a guide number) and the distance from the object, the calculated $f$-value being set on the camera. However, because of the wide latitude of a modern day photographic film, flash mode photography is permitted provided that the allowable distance from the object is limited to a practically allowable range, for example in a range of 1.5 to 3 meters.

Since it is desired to reduce the size of the apparatus for convenient carrying, a limitation is also imposed on the size of the electronic flashing device, which results in a smaller amount of light. On the other hand, since only one $f$-value can be set in the flash mode operation, the allowable range of the distance from the object is limited. This is due to the following reason.

It is desirable that an object at a distant location can be photographed using flash mode photography. In order to accomplish this by the above device, the $f$-value or aperture value of the iris diaphragm is set to a large value. However, latitude of the modern day photographic film is not wide enough to allow proper photography of an object at a short distance which could be properly photographed with an $f$-value before magnification. Thus, the range of the allowable distance of the object cannot be expanded by magnifying the $f$-value because the lower or shorter limit of the allowable distance range is changed considerably by an amount corresponding to the amount of extension of the upper limit of the allowable distance range.

Accordingly, when a single $f$-value is used, the extent of the allowable distance range for proper photography remains substantially the same whatever magnitude of $f$-value is selected.

In the meantime, an automatic electronic flashing device has been recently developed and put into practice, in which the reflected light from the object is received by a light receiving circuit, which disables the firing of a flashing discharge tube when the amount of light received reaches a predetermined value.

When such an automatic electronic flashing device is used with the above flash and camera device, the allowable distance range for proper photography in flash mode photography can be widened even with a single preset f-value, and a proper exposure can be assured with the allowable distance range.

The above automatic electronic flashing device, however, includes a complex electric circuit and is expensive, which necessarily results in the increase of cost of the flash and the camera device.

It is, therefore, a first object of the present invention to provide a flash and camera apparatus integrally incorporating an electronic flashing device which is not capable of automatically disabling the firing and a photographic camera device with a fixed focus lens system, which allows increase of the allowable range of distance from the object for the purpose of photography in the flash mode, within a practically allowable range from the viewpoint of the latitude of the photographic film, i.e. within a range in which there appears no substantial difference in exposure condition depending on the distance from the object.

It is a second object of the present invention to provide indication means which indicates the condition of the electronic flashing device when it is capable of firing for flash mode photography and also indicates the distance from the object i.e. far or near, to assure that the operator notes the distance indication to prevent any possible misoperation.

It is a third object of the present invention to enable the identification of the indication by the indication means within a view field of a finder of the device as well as externally thereof.

It is a fourth object of the present invention to provide switching means which simultaneously performs the functions of switching between daylight mode photography and flash mode photography, switching of a power supply for the electronic flashing device and operation necessary for the operation of the indication means, for simplifying the operation of the flash and camera apparatus.

The flash and camera device in accordance with the above objects is first provided with $f$-value change-over means by which an appropriate $f$-value of the iris diaphragm is changed depending on whether daylight mode or flash mode photography is selected and whether far mode or near mode photography is selected in the flash mode photography.

Switching means is provided for switching the $f$-value change-over means to a proper $f$-value for the photography mode selected and for turning on and off the power supply for the electronic flashing device.

Indication means is further provided, which is electrically connected to the switching means for indicating far mode and near mode in the daylight mode and flash mode photography and indicating that the electronic flash device is capable of firing. Namely, it indicates the non-use of the electronic flash device in daylight mode photography, and in the flash mode photography it gives different indications depending on whether the far mode or near mode has been selected. The presence of the indication shows that the condition of the electronic flash device is capable of being fired, the indication means being activated by the switching means.

The above and other objects, features and advantages of the present invention will be apparent from the following detailed description of the preferred embodiment of the invention when taken in conjunction with the accompanying drawings, in which.

Figure 1:
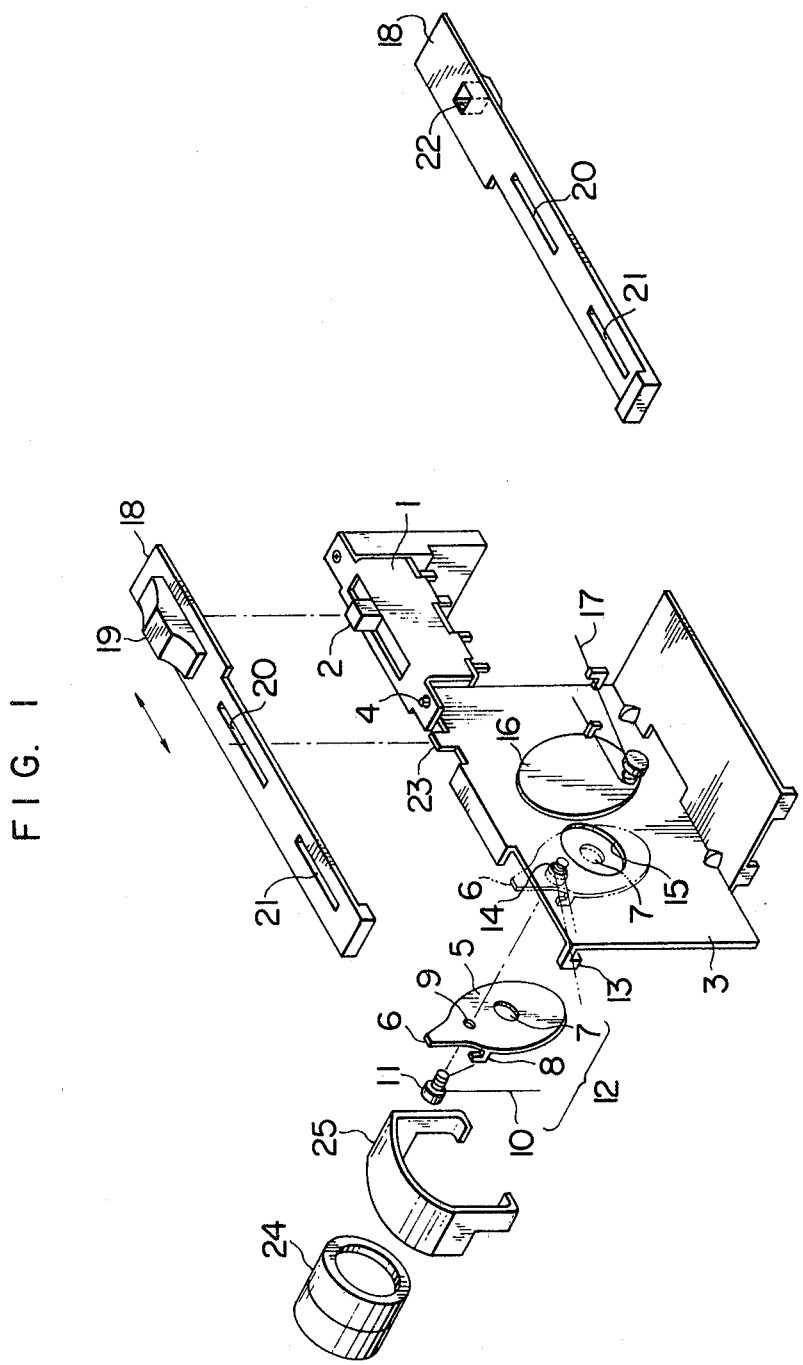
FIG. 1 is an exploded perspective view showing an f-value change-over and switching mechanism for the flash and camera apparatus of the present invention.

Referring to FIG. 1, there is shown, in an exploded perspective view, a mechanism of one embodiment of the f-value change-over means and switching means used in the flash and camera apparatus of the present invention.

In FIG. 1, a switch 1 has eight terminals and a knob 2 for switching the electrical connections of those terminals, switch 1 being mounted on a projection 4 at one end of a fixed plate 3, as shown. An f-value or aperture change-over means for changing the f-value or aperture of an iris diaphragm is mounted on the fixed plate 3. The change-over means comprises an iris vane 5, a mounting member 11 for mounting the iris vane 5 to the fixed plate 3 and a spring 10 for loading the iris vane 5.

The iris vane 5 has a small opening 7, a projection 6, an ear 8 which engages one end of the spring 10 and a hole 9 through which the mounting member 11 extends. The iris vane 5 is mounted on the fixed plate 3 as shown by a dotted line by inserting the mounting member 11 through the hole 9 of the iris vane 5 into a hole 14 of the fixed plate 3 and engaging the spring 10 with the engaging ear 8 of the iris vane 5 and an engaging ear 13 of the fixed plate 3. An opening 15 having a larger aperture area than the opening 7 is formed in the fixed plate 3. A shutter vane 16 for blocking light transmitted through the opening 15 and/or the opening 7 is actuated by the drive force of a spring 17.

A connecting member 18 connects switch 1 with vane 5 of the f-value change-over mechanism 12. Member 18 comprises a knob cover 19, slots 20 and 21 and a square hole 22 at the rear of the knob cover 19. Knob 2 of switch 1 fits within the square hole 22. The member 18 and the knob cover 19 are integral. Inserted into the slot 21 of the connecting member 18 is the projection 6 of the iris vane 5, and into the slot 20 is a projection 23 of the fixed plate 3, the knob 2 fitting into the hole 22. In this manner the member 18 is mounted on the switch 1 and the fixed plate 3. In the figure, reference numeral 24 designates a lens system and 25 designates a mounting frame for mounting the lens.

Figure 2:
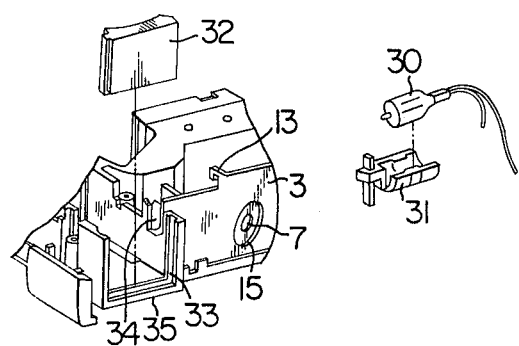
FIGS. 2 and 3 are exploded perspective views showing an indication mechanism for the flash and camera apparatus of the present invention.
Figure 3:
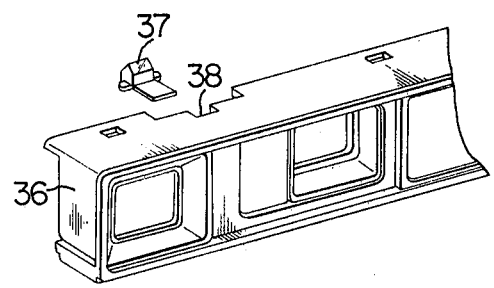

FIGS. 2 and 3 illustrate an indication mechanism linked to switch 1 for indicating the operation mode of the flash and camera device. It includes an indication element 30 such as a neon tube mounted on a support 31 which, in turn, is mounted in fitting relation with a mount 34 in a finder 35 and a transparent front panel 32 fitted in a fitting groove 33 of finder 35. A prism 37 is mounted on a mount 38 of a front frame 36 of the device to permit external observation of the indication element 30.

Figure 4:
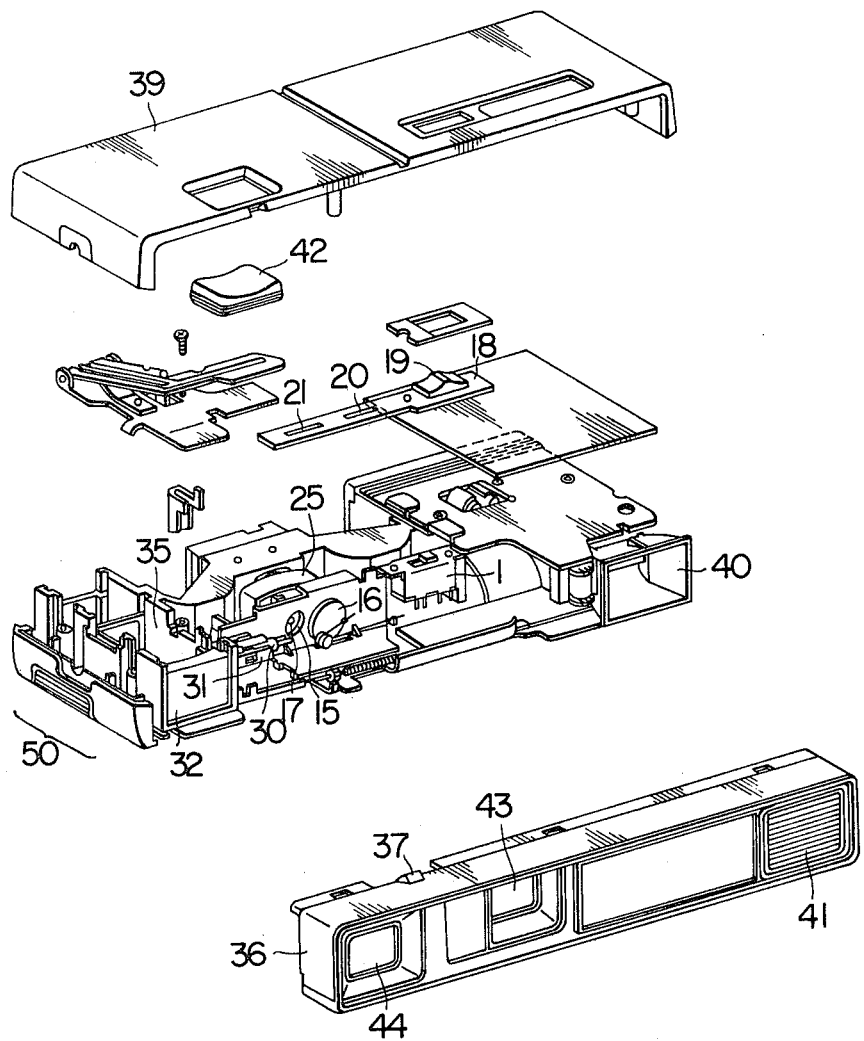
FIG. 4 is an exploded perspective view showing the flash and camera apparatus of the present invention including the switching mechanism of FIG. 1 and indication mechanism of FIGS. 2 and 3.

FIG. 4 is an exploded diagram of the flash and camera device of the present invention. In the drawing, the mechanisms shown in FIGS. 1 and 2 are mounted at main section 50 of the flash and camera device, which main section 50 includes a light emitting section 40 including a reflecting box containing a flash discharge lamp of the electronic flash device, electrical means for firing the flash discharge tube, a film loading mechanism, a mechanism for actuating the shutter vane 16 and the lens system. An upper cover 39 is mounted on the major section 50 together with a shutter button 42 for operating the mechanism for actuating the shutter vane 16, the connecting member 18 and other necessary parts. The front frame 36 has a transparent panel disposed in front of the openings 15 and 17, a light transmitting panel 41 disposed in front of the light emitting section 40 and a window frame 44 disposed in front of the front panel 32 of the finder 35.

Figure 5:
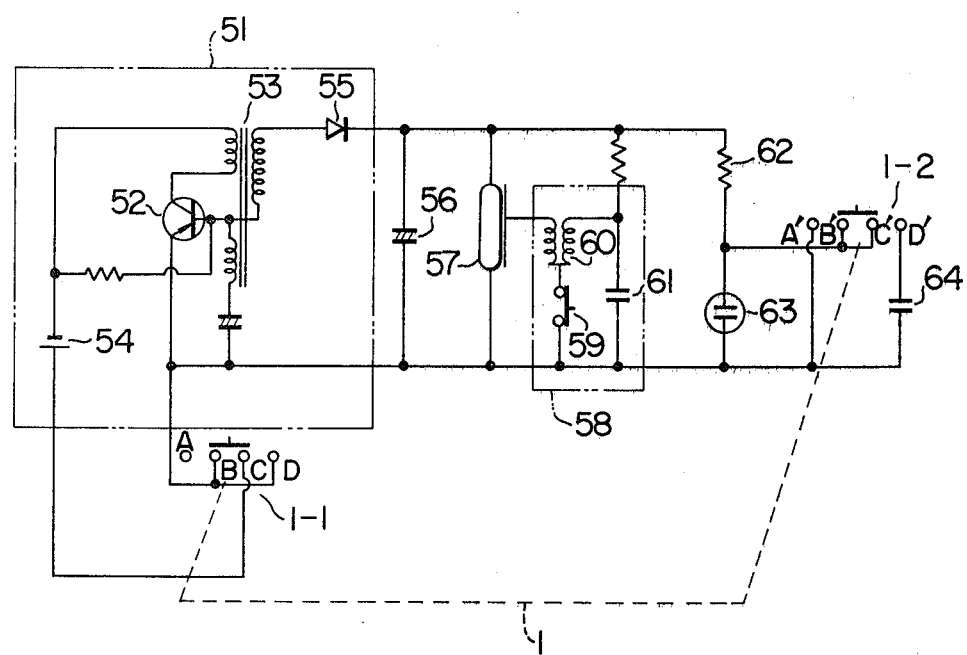
FIG. 5 is an electric circuit diagram of an electronic flash for the flash and camera apparatus of the present invention.

FIG. 5 shows an electrical circuit diagram of the electronic flash device associated with the above mechanisms. In the drawing, a well known DC-DC converter circuit for producing a D.C. high voltage is shown, which converter comprises an oscillation transistor 52, an oscillation transformer 53, a battery 54, and a diode 55. A main discharge capacitor 56, a flash discharge tube 57 and a trigger circuit 58 for applying a high voltage pulse to the flash discharge tube 57 are included the trigger circuit 58 comprising a switch 59, a triggering transformer 60 and a capacitor 61. Also included are a resistor 62 and an indicating element 63 such as a neon tube which corresponds to the neon tube 30 shown in FIGS. 2 and 4. The switch 1 corresponds to the switch 1 shown in FIGS. 1 and 2, which is operated in accordance with the operating mode of the device.

Figure 6A:
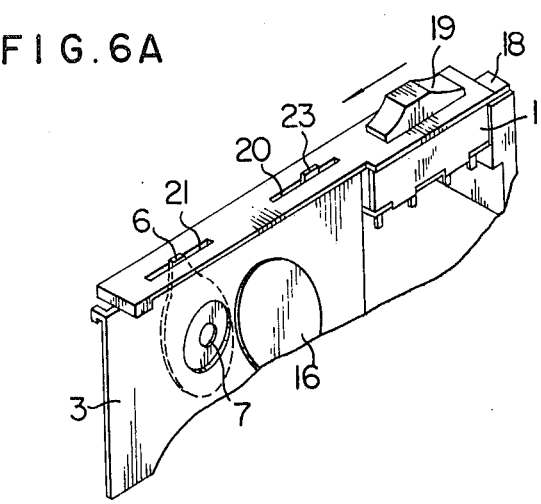
FIGS. 6A and 6B are perspective views showing the f-value change-over operation of the f-value setting means of the present invention.
Figure 6B:
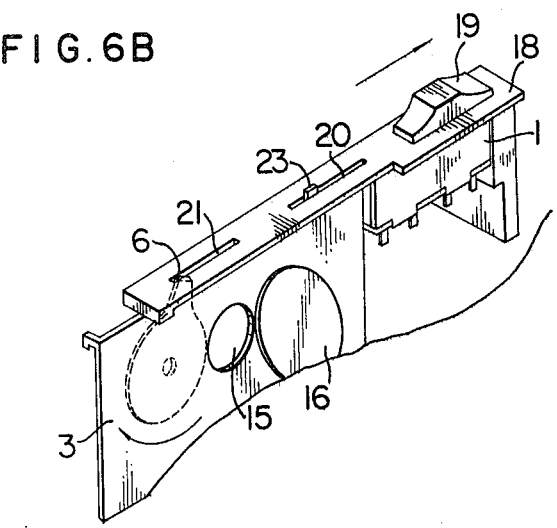

The operation of the device is now explained in conjunction with FIGS. 6A and 6B which illustrate operations of the switch and the f-value change-over mechanism.

The flash and camera device of the present invention assumes one of the following three operational modes.

1. Daylight mode photography where the brightness of an object is high enough to eliminate the need for firing the flash discharge tube 57:

The connecting member 18 is moved in the direction of the arrow shown in FIG. 6A through the knob cover 19 to short-circuit the terminals A and B of the terminal group 1-1 of the switch 1 and the terminals A' and B' of the terminal group 1-2. Thus, since the battery 54 is not connected to the DC-DC converter circuit 51, the latter does not operate and the main discharge capacitor 56 is not charged.

On the other hand, under these conditions, since the projection 6 of the iris vane 5 merely slides in the groove 21 of the connecting member 18 and no force is applied to the projection 6, the iris vane 5 is not moved but remains stationary under the loading force of the spring 10. Thus, as shown in FIG. 6A, a smaller f-value defined by the opening 7 is selected. When the shutter button 42 is depressed under this condition, the shutter vane 16 is operated to conduct the photography.

2. When the brightness of the object is low enough to require the firing of the flash discharge tube 57 and the object is at a short distance:

By moving the connecting member 18 by the knob cover 19 to short-circuit the terminals B and C of the group 1-1 of the switch 1 and the terminals B' and C' of the group 1-2 of the switch 1, the DC-DC converter circuit 51 is connected to the battery 54 so that it is operated to generate a D.C. high voltage, which then charges the main discharge capacitor 56 and the capacitor 61.

When the charge voltage of the main discharge capacitor 56 reaches a predetermined value, a current flows through the neon tube 63 via the resistor 62 so that the neon tube is continuously fired.

On the other hand, under this condition, since the projection 6 of the iris vane 5 merely slides in the groove as before, the smaller *f*-value defined by the opening 7 shown in FIG. 6A is selected. The firing state of the neon tube 63 can be observed within the field of view of the finder, and externally through the prism 37, as shown in FIGS. 2, 3 and 4. When the shutter button 42 is depressed under this condition, the switch 59 of the trigger circuit is turned on and the flash discharge tube 57 is supplied with a high voltage pulse and fires consuming the charge stored in the main discharging capacitor 56, and at the same time the shutter vane 16 is operated. In this manner, flash mode photography for a short distance object is conducted.

3. When the brightness of the object is low enough to require the firing of the flash discharge tube 57 and the object is at a distant location within an allowable range of distance for proper photographing determined by the amount of light available from the flash discharge tube 57 and the *f*-value of the iris diaphragm:

By moving the connecting member 18 by the knob cover 19 in the direction shown by the arrow in FIG. 6B to short-circuit the terminals C and D in the group 1-1 of the switch 1 and the terminals C' and D' in the group 1-2, the DC-DC converter circuit 51 is actuated as in the case of (2) above and the main discharging capacitor 56 and the capacitor 61 are charged.

On the other hand, since the projection 6 of the iris vane is this time caught by the lefthand end of the groove 21, the iris vane 5 is rotated in the direction of the arrow shown in FIG. 6B so that the opening 15 is positioned in front of the lens 24 to provide a larger *f*-value.

Since the terminals C' and D' in the group 1-2 of the switch 1 are short circuited, the neon tube 63 is connected in parallel with the capacitor 64. Thus, when the charge voltage of the main discharge capacitor 56 reaches a predetermined voltage, a current flows through the parallel circuit of the neon tube 63 and the capacitor 64 via the resistor 62. This current initially flows into the capacitor 64 having a lower impedance and when the charge voltage of the capacitor reaches a predetermined voltage the neon tube 63 fires. Thereafter the neon tube 63 intermittently fires as the capacitor 64 repeats charging and discharging. If the shutter button 42 is depressed under this condition, flash mode photography is conducted as described before.

What is claimed is:

1. In a flash and camera apparatus integrally incorporating a photographic camera device with a fixed focus lens system and an electronic flash device having a flash discharge tube which emits flash light by discharging energy stored in a main discharge capacitor, the improvement comprising an aperture member comprising part of said photographic camera device and having a first aperture therein, the size of said first aperture being suitable for photographing an object, using flash-mode photography, which is located at a relatively long distance from said camera device, an iris vane positioned adjacent said apertured member and having a second aperture therein, the size of said second aperture being less than that of said first aperture and suitable for photographing an object, using flash-mode photography, which is located at a relatively short distance from said camera device, said second aperture also being suitable for daylight mode photography;

mode switching means for coupling a power switch for said electronic flash device to said iris vane so that operation of said power switch causes movement of said iris vane; and holding means for holding said iris vane in a first position wherein said vane blocks said first aperture so that light entering said camera passes through said second aperture.

2. Flash and camera apparatus according to claim 1 wherein said mode switching means includes a connecting member having a groove therein slidably attached to said apertured member and secured to said power switch for operation thereof, a projection on said iris vane projecting through the groove in said connecting member, said iris vane being displaced by contact of said projection on an edge of said groove when said connecting member is moved thereby removing said vane from said first position blocking said first aperture to a second position wherein light entering said camera passes through said first aperture and not said second aperture.

3. Flash and camera apparatus according to claim 1 which further comprises a first indication circuit operable in response to movement of said power switch by said mode switching means to the position for flash-mode photography when said object is located at a relatively short distance from said camera device, said first indication circuit providing a first light indication when the voltage across said main discharge capacitor reaches a sufficient magnitude to ignite said flash discharge tube; and a second indication circuit operable in response to movement of said power switch by said mode switching means to the position for flash-mode photography when said object is located at a relatively long distance from said camera device, said second indication circuit providing a second light indication different from said first light indication when the voltage across said main discharge capacitor reaches a sufficient magnitude to ignite said flash discharge tube.

4. Flash and camera apparatus according to claim 3 wherein said first indication circuit includes a resistor and a light emitting device connected across said main discharge capacitor.

5. Flash and camera apparatus according to claim 3 wherein said second indication circuit includes a resistor and a light emitting device connected across said main discharge capacitor and a second capacitor connected through said switch across said light emitting device.

* * * * *